United States Patent [19]
Betts et al.

[11] 3,924,985
[45] Dec. 9, 1975

[54] APPARATUS FOR MAINTAINING A PRESSURIZED LIQUID-GAS INTERFACE WITHIN A CONDUIT

[75] Inventors: Joseph Elwood Betts, Westport; William Michael Ott, Jr.; Howard Thomas Vaum, both of Trumbull, all of Conn.

[73] Assignee: General Electric Company, New York, N.Y.

[22] Filed: Dec. 23, 1974

[21] Appl. No.: 535,669

[52] U.S. Cl. .................. 425/72; 165/65; 425/86; 425/113; 425/404; 425/445
[51] Int. Cl.² ........................................ B29C 25/00
[58] Field of Search........... 165/65; 264/176 R, 272; 425/113, 114, 378, 379, 377, 72, 445, 446, 404, 71, 86

[56] References Cited
UNITED STATES PATENTS

| | | | |
|---|---|---|---|
| 2,540,497 | 2/1951 | Stiegler | 425/113 X |
| 2,561,820 | 7/1951 | Ramsey et al. | 425/135 X |
| 2,789,314 | 4/1967 | Davis | 425/86 |
| 2,952,870 | 9/1960 | Mark | 425/86 |
| 3,295,163 | 1/1967 | Bachus | 425/404 X |

FOREIGN PATENTS OR APPLICATIONS 225,613   5/1943   Switzerland.......................... 425/113

*Primary Examiner*—Robert D. Baldwin
*Assistant Examiner*—Mark Rosenbaum
*Attorney, Agent, or Firm* —R. G. Simkins; P. L. Schlamp; F. L. Neuhauser

[57] ABSTRACT

An apparatus for establishing and fixing an interface between a liquid under pressure and a gas under pressure within an enclosed elongated passage such as a system for the sequential heating with a gas and then cooling with a liquid of a material moving through the enclosed passage. The apparatus comprises a closed chamber interposed in the system at the approximate location of the junction of the liquid and gas interface, combined with pressure sensing means, to define and maintain the interface.

9 Claims, 1 Drawing Figure

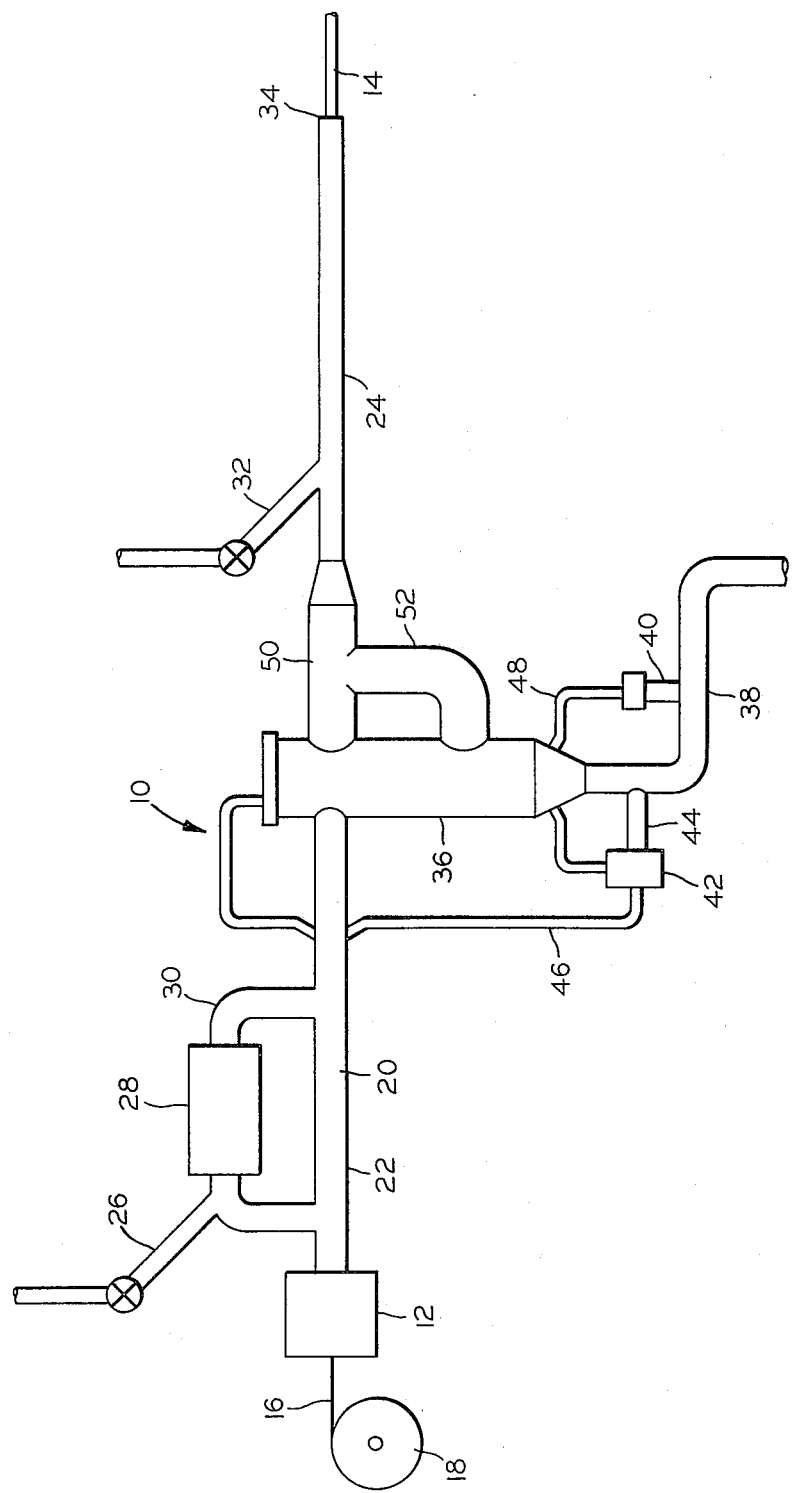

APPARATUS FOR MAINTAINING A PRESSURIZED LIQUID-GAS INTERFACE WITHIN A CONDUIT

BACKGROUND OF THE INVENTION

The establishment and maintenance of an interface junction between a gas under pressure and a liquid under pressure is a significant factor and problem in certain heating and cooling operations, such as continuous processes for heat curing and cooling of products under pressure, which has been the subject of several systems and patents. For instance, a substantial number of mechanical schemes based upon seals and/or baffle arrangements, or complex labyrinths, have been proposed and patented, namely U.S. Pat. Nos. 2,069,087; 2,373,816; 2,446,620; 2,837,764; 3,295,163 and 3,645,656; and British Pat. No. 564,324 of Sept. 22, 1944. However, all such systems employing mechanical measures to establish and maintain a pressurized liquid-gas interface are subject to the common impediments of a high incidence of physical damage to the easily deformable, hot thermoplastic or newly cured thermosetting material or products thereof, as well as rapid rates of wear of the seals or baffles, etc., their plugging or excessive leakage.

Another principal system for establishing and maintaining a pressurized liquid-gas interface junction is based upon liquid and/or gas pressure manipulating apparatus or arrangements, for example U.S. Pat. Nos. 2,540,497; 2,561,820; 2,789,314 and 2,952,870. However, the systems disclosed in the two former U.S. Pat. Nos. 2,540,497 and 2,561,820, do not avoid or overcome the commonly encountered surging of the pressurized liquid or gas through the interface boundry, and the systems disclosed in the two latter U.S. Pat. Nos. 2,789,314 and 2,952,870, entail a gravity established interface junction or boundary between the pressurized liquid and gas requiring a vertical or substantially sloped container or conduit.

Moreover, these prior art schemes are primarily designed for and useful with systems employing steam and water as the source of the pressurized gas and liquid mediums which minimizes the effects of any malfunctions therein such as the temporary displacement of the interface within the system due to surging of either the steam vapor or water, or an intermingling of such gas-liquid mediums of the same composition. Also, the abrasion or tearing damage commonly caused by seals, baffles or other physical barriers upon the products is minimal because of the lubricating effects of the condensing steam and/or the water.

SUMMARY OF THE INVENTION

This invention comprises a novel apparatus, and combination of components and functions thereof, which provides for the effective establishment or defining and maintenance of an interface junction or boundary between a gas under high pressure and a liquid under high pressure applied within a substantially horizontal conduit or elongated container whereby the gas under pressure and liquid under pressure are each motivated to move through the conduit or container and thereby oppose each other in countercurrent directions. The apparatus of the invention includes, in addition to the horizontal or substantially horizontal conduit or enclosed passage provided with a source of gas under pressure in one section thereof and with a source of liquid under pressure in an opposite section thereof, a closed chamber which is interposed into the conduit between the pressurized gas and liquid sections thereof at approximately the location of the desired interface junction or gas-liquid boundary. The closed chamber divides or bisects the generally horizontally disposed conduit or passage and is in direct fluid communication with each section, and a substantial portion of the volume of the chamber extends downward from the level of the conduit so as to provide an underlying gravity fed liquid reservoir therein. The chamber is provided with a drain and drain valve controlled by a pressure sensing regulator and pressure monitoring system.

The invention is particularly applicable to the continuous heat curing or vulcanization of polymeric stock or products thereof comprising heat curable or thermosetting polymers, such as polymer insulated electrical conductors. The curing of such materials should be effected by a rapid heating followed by rapid cooling down to approximately ambient temperature conditions, within minimum space requirements, while maintained under substantially the same pressure conditions through the high temperature curing and cooling prior to their release or exposure to ambient atmospheric conditions. The pressure should be maintained through both steps to avoid the development or generation of pores or voids within the body of the newly cured polymeric material due to the internal expansion of gases or flashing of water or other volatiles entrained therein into gases following a rapid reduction in ambient pressure while the polymeric material is still at high internal temperatures.

The apparatus of this invention, moreover, is sufficiently effective in fixing and stabilizing a pressurized liquid-gas interface within a substantially horizontal conduit or enclosed passage so as to permit the use of liquid-gas media other than water and steam, or including liquid-gas materials of different chemical compositions, and to insure the prevention of any significant penetrations of a liquid through the interface area and into the gas heating section and possible damage thereto.

OBJECTS OF THE INVENTION

It is a primary object of this invention to provide an apparatus for establishing or defining and fixing a pressurized liquid-gas interface junction within a substantially horizontal conduit, and controlling or stabilizing the location of the interface junction.

It is also an object of this invention to provide an apparatus including a substantially horizontal conduit with a gas under pressure contained therein and a liquid under pressure contained therein forming a gas-liquid phase interface or boundary, and which effectively dampens or inhibits pressure surges therebetween and the effects thereof, or the thrusting of one phase significantly into the area of the other and the displacement of one medium by the other.

It is a further object of this invention to provide means for continuously and sequentially heating and cooling polymeric stock, or products formed thereof, by continuously passing the stock or products through a substantially horizontal conduit having in tandem a heating section containing a gas under pressure and a cooling section containing a liquid under pressure and which forms and maintains a stable gas-liquid interface junction between said sections and the media thereof, and thereby insures uniform and complete curing and cooling of the polymeric stock or products thereof.

It is a still further object of this invention to provide novel system and an improved apparatus therefor for a continuous rapid heat curing or vulcanization of products, such as insulated electrical conductors comprising curable or thermosetting polymeric compositions by means of a pressurized gas heat transfer medium, and the rapid cooling of the thus cured or thermoset products by means of a pressurized liquid cooling medium under substantially constant pressure conditions throughout.

It is an additional object of this invention to provide apparatus for the heat curing or vulcanization of polymeric materials which establishes and preserves a pressurized liquid-gas interface junction within a conduit or passage and is free of physical restrictions or obstructions such as seals, baffles, labyrinths that can impede the passage of material through the apparatus, or cause damage thereto.

BRIEF DESCRIPTION OF THE DRAWING

The DRAWING comprises a schematic illustration of the apparatus embodying the present invention as incorporated into a system for the manufacture of heat cured, polymeric insulated wire products.

DESCRIPTION OF A PREFERRED EMBODIMENT

Referring to the drawing, the apparatus shown includes a system 10 for the production of insulated electrical conductors, such as wire covered with a heat cured polymeric insulating composition, embodying the means of this invention. The illustrated apparatus and system 10 comprise an extruder 12, or head thereof, for the continuous formation of a coating or covering of heat curable polymeric insulating compound 14 about an electrical conductor core member 16 continuously moved therethrough from a supply reel 18.

An elongated conduit 20, or enclosed passage, is combined with and connected to the outlet of extruder 12, and extends therefrom in a horizontal or substantially horizontal position or arrangement for the containment and movement therethrough of the conductor core member 16 covered with the insulation formed thereon and continuously emanating from the extruder. Conduit 20 includes two tandem sections or areas, an upstream heating section 22 adjacent to the extruder 12, and a downstream cooling section 24, for the continuous sequential heat curing and cooling of the cured polymeric insulation material 14 formed about the conductor core member 16 by the extruder 12.

The heating section 22 of the substantially horizontal conduit 20, is connected with a source of gas under pressure, diagrammatically illustrated as 26, and includes suitable heating and circulating means 28, such as an electric heater and fan, and a recirculating conduit 30 for the gas heat transfer medium. The heat carrying gas supplied under pressure substantially fills the heating section 22 of the conduit 20 and the pressure of its source motivates the gas to move in the direction of the cooling section 24, opposing the liquid contents thereof.

The cooling section 24 of the substantially horizontal conduit 20, is connected with a source of cooling liquid under pressure, diagrammatically illustrated as 32. The cooling liquid supplied under pressure substantially fills the cooling section 24 of the conduit 20 and the pressure of its source motivates the liquid to move in the direction of the heating section 22, opposing the gas contents thereof. Thus in effect both the gas and the liquid under pressure are motivated to move in opposing directions and displace each other.

The terminus or outlet end of the cooling section 24 can be provided with a conventional seal 34 or other suitable physical barrier to impede or block the uninhibited escape of the cooling liquid. A seal or other conventional means is not normally detrimental at this location because of the curing and cooling of the polymeric material is substantially completed at this stage and it therefor possesses the physical durability to resist damage therefrom. Moreover, the liquid coolant provides a lubricant for the product passing through the seal.

In accordance with this invention, a closed chamber 36 is interposed into the substantially horizontal conduit 20, dividing the conduit 20 at approximately the area of the designed interface junction or boundary between the heating section 22 connected with a source of gas under pressure and the cooling section 24 connected with a source of liquid under pressure. Closed chamber 36 is in direct fluid communication with each section 22 and 24 of the conduit 20 whereby it intercepts liquid flow therethrough.

The closed chamber 36 is of relatively large volume with respect to the contents of the cooling section 24, and extends downward from the level of the substantially horizontal conduit 20 for a substantial distance to provide a gravity feeding liquid reservoir depending from the conduit 20 for the entrapment of liquid therefrom. For example, in a typical embodiment of this invention such as illustrated in the drawing, a generally vertically arranged tank-like container divides the conduit 20 and is joined in fluid communication with each ends thereof adjacent its upper end portion.

Closed chamber 36 is provided with a drain outlet 38 connected with a lower portion thereof, and a drain valve 40 in the drain outlet to control the discharge from the chamber through the outlet 38.

The apparatus of this invention also includes a pressure sensing regulator unit 42, having pressure monitoring means or ducts 44 and 46 which connect with and convey the pressure conditions of the gas and the liquid media within the system. Pressure sensing regulator 42, for example, may consist of a conventional diaphragm operated regulator, such as a Foxboro control valve, GS4,261A, constructed with two opposed pressure chambers separated by an intermediate, spring biased flexible diaphragm, with each chamber communicating with and monitoring a different source of pressure such as disclosed in U.S. Pat. Nos. 1,851,422 and 2,737,973.

Pressure sensing regulator 42 is operatively connected with and controls the opening and/or closing of drain valve 40, such as though fluid duct 48. The pressure sensing regulator 42 may be associated with a hydraulic, pneumatic or electrical amplifying or control implementing system to enhance its response to changes.

In the present invention, the pressure sensing regulator 42 monitors or reads the fluid pressure of the gas within the system through duct 46, which pressure condition or level is transferred to one side of the diaphragm, while at the same time monitoring or reading the combined pressures within the system at a location adjacent the bottom of the closed chamber 36 through duct 44, which pressure condition or level is transferred to the other side of the diaphragm. The combined pressure condition as measured at a lower location of the closed chamber 36 will of course comprise the sum of the pressures of the gas and the pressure of the static head of any liquid collected in the chamber above the duct level.

The tension loading of the spring applying pressure upon the intermediate diaphragm is adjustable whereby the pressure sensing regulator can be adjusted to respond to any degree or level of disproportionate pressures within the system such as the pressure of the gas as measured through duct 46 and the total pressure of the gas and heat of liquid as measured through duct 44. The apparatus of this system thus provides for the setting of pressure sensing regulator 42 to respond to any given or predetermined differentiation between the pressure of the gas within the conduit and the combined pressure of the gas within the conduit plus the pressure of the weight or static head of the water collecting within the closed chamber 36, and react thereto by opening or closing drain valve 40 and thereby regulating the quantity of water collected and retained therein.

The highly responsive and precise degree of regulation and adjustment of the discharge through the drain from the system provided by the apparatus, and in turn control over and modulation of pressure changes or surges of the liquid within the system, provide for the establishment and fixing of a stable gas-liquid interface within the substantially horizontal conduit 20.

In addition to governing drain valve 40, the pressure sensing regulator 42 can be combined with visual or auditory signal means to alert an operator of significant changes in pressure conditions within the system and in turn malfunctions requiring further or overriding remedial measures.

Further in accordance with one embodiment of the invention, the portion 50 of section 24 of conduit 20 adjoining the closed chamber 36 is provided with an enlarged cross sectional area such as illustrated in the drawing. The enlargement of the cross sectional area can be about two to three times that of the remainder of the section 24. This enlargement of the conduit adjacent to the closed chamber has a significant dampening effect upon pressure surges within the system which preserves the interface junction, as well as insuring the interception and diversion of any surging liquid down into the closed chamber.

In another desirable embodiment of this invention, a tubular leg 52 is provided as an intercepter bypass to draw off liquid approaching the interfact area or boundary. Tubular leg 52, as illustrated, is desirably of substantially enlarged cross sectional area comparable to that of portion 50 of section 24, for example about two to three times the area of section 24, and it depends down therefrom and connects in fluid communication with the closed chamber at an intermediate portion of the side wall thereof as shown. The bypass leg 52 thus intercepts liquid flow within the section 24 of the horizontal conduit adjacent to the closed chamber and/or the boundary of the interface established thereby, and diverts it away from the interface and into the closed chamber. Moreover, the increased internal area adjacent the interface area provided by the bypass leg connection furthers the dampening effects upon pressure surges to the extent of substantially insuring the suppression at any effects thereof or the discernable penetration of any liquid due thereto into the pressurized gas heating section.

The operation of one embodiment of this invention comprises the following. A core member 16, such as a wire, is continuously advanced through the system including the extruder 12 wherein a covering of a heat curable polymeric composition 14 is applied to the core, and then the covered core member moves through the heating and cooling sections 22 and 24 of conduit 20 wherein the curable composition is sequentially quickly cured and cooled under pressure before being discharged to ambient atmospheric conditons.

To effectuate the apparatus of the invention, a heat transferring or carrying gas, such as carbon dioxide or nitrogen, is introduced under pressure into the curing section 22 of conduit 20 and therein heated and circulated through heater 28 and duct 30, while at the same time a coolant liquid, such as water, is introduced under pressure into the cooling section 24 of conduit 20. Ideally the pressures of each the gas heating medium and the liquid cooling medium should be exactly balanced so as to stabilize the system. Nevertheless, it is highly impractical to achieve and maintain an even balance of pressures for fluids from different sources, and in particular with most commercial production equipment and under factory operating conditions. Moreover, the attainment of a precise equilization of pressures by itself does not prevent the occurrence of pressure surges, or neutralize or even dampen the effects thereof.

The apparatus of this invention, and its operation, however, takes into account such conditions and occurrences, and provides for the forestallment or obviation of effects thereof. For example, in the operation of this embodiment, the pressure of the coolant liquid entering the system is preset at a level slightly higher than the operating pressure of the heat conveying gas entering the system so that the liquid substantially fills the cooling section 24 and a small quantity or flow of the liquid will continually force its entry into the interface boundary area defined and maintained by the interposed chamber 36. This minuscular flow of coolant liquid within the conduit 20 is intercepted at the interface area by the interposed chamber 36, or bypass leg 52 and diverted into the reservoir of the chamber. As the diverted liquid from the flow accumulates within the reservoir, the increasing weight of its static head offsets the adjusted pressure balance between the gas and liquid within pressure sensing regulator 42, activating and governing drain valve 40 to discharge through the drain sufficient liquid to compensate for the liquid diverted into the reservoir chamber. The system thus provides for and attains a balanced operation utilizing commercial components and with fluids supplied from different pressurized sources while operating under factory conditions.

The inevitable occurrence of pressure surges, and the thrusting effects of the liquid or gas media due thereto, are averted or dampened by the enlarged cross sectional area of portion 50 of the cooling section 24 of the conduit 20, and also the enlarged leg bypass 52. This construction tempers the effects of pressure surges and/or medium displacement in either direction, and in particular the penetration of the coolant liquid through the interface and into the heating section wherein sensitive components such as heating elements can be permanently damaged such as by contact with a liquid or thermal shock due to great temperature changes as well as a temporary or intermittent suppression of curing conditions and as a result thereof erratic or incomplete cures in the product.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. Apparatus for establishing and fixing a liquid-gas interface within a substantially horizontal conduit, comprising:
   a. an elongated substantially horizontal conduit having a gas section connected with a source of gas under pressure and an adjoining liquid section connected with a source of liquid under pressure whereby both the gas and liquid are motivated by the pressure of their source to extend through the conduit counter to each other;
   b. a closed chamber interposed into the substantially horizontal conduit at approximately the location of the liquid-gas interface to be established and fixed between the pressurized gas and liquid section of the conduit and connected in direct fluid communication with each of said sections, said closed chamber extending downward from the level of the substantially horizontal conduit for a substantial distance to provide a gravity feeding liquid reservoir chamber depending therefrom;
   c. a drain outlet connected with a lower portion of the closed chamber and a drain valve located in said drain outlet for controlling the discharge of liquid from the closed chamber; and
   d. a pressure sensing regulator operating the drain valve and having pressure monitoring means responding to the pressure of the gas in the gas section of the conduit and the combined pressure of the gas with the pressure attributable to the weight of the liquid head contained within the closed chamber whereby the accumulation of liquid within the interposed closed chamber overcomes a predetermined balance of pressure between the source of gas and source of liquid and activates the drain valve to discharge liquid from the closed chamber.

2. The apparatus of claim 1, wherein an adjoining portion of the liquid section of the conduit connected with the closed chamber is of an enlarged cross sectional area of at least about twice the area of the remainder of the liquid section of the conduit.

3. The apparatus of claim 1, wherein a tubular leg depends from a portion of the liquid section of the conduit adjoining the closed chamber and connects with the closed chamber at an intermediate portion thereof below the substantially horizontal conduit and provides a fluid communicating bypass connection between the liquid section of the conduit and the closed chamber.

4. The apparatus of claim 3, wherein the tubular leg is of an enlarged cross sectional area.

5. Apparatus for establishing and fixing a liquid-gas interface within a substantially horizontal conduit, comprising:
   a. an elongated substantially horizontal conduit having a gas section connected with a source of gas under pressure and an adjoining liquid section connected with a source of liquid under pressure whereby both the gas and the liquid are motivated by the pressure of their sources to extend through the substantially horizontal conduit counter to each other;
   b. a closed chamber interposed into the substantially horizontal conduit at approximately the location of the liquid-gas interface to be established and fixed between the pressurized gas and liquid section of the conduit and connected in direct fluid communication with each of said sections, said closed chamber extending downward from the level of the substantially horizontal conduit for a substantial distance to provide a gravity feeding liquid reservoir chamber depending therefrom;
   c. an adjoining portion of the liquid section of the conduit connected with the closed chamber having an enlarged cross sectional area of at least about twice the area of the remainder of the liquid section of the conduit;
   d. a tubular leg depending from a portion of the liquid section of the substantially horizontal conduit adjoining the closed chamber and connecting with the closed chamber at an intermediate portion thereof below the substantially horizontal conduit and thereby providing a fluid communicating bypass connection between the liquid section of the conduit and the closed chamber;
   e. a drain outlet connected with a lower portion of the closed chamber and a drain valve located in said drain outlet for controlling the discharge of liquid from the closed chamber; and
   f. a pressure sensing regulator operating the drain valve and having pressure monitoring means responding to the pressure of the gas in the gas section of the conduit and the combined pressure of the gas with the pressure attributable to the weight of the liquid head contained within the closed chamber whereby the accumulation of liquid within the interposed closed chamber overcomes a predetermined balance of pressure between the source of gas and source of liquid and activates the drain valve to discharge liquid from the closed chamber.

6. An apparatus for the continuous manufacture of insulated electrical conductors covered with heat cured polymeric compositions, comprising a combination of an extruder for the continuous formation of a covering of heat curable polymeric material about an elongated electrical conductor moving therethrough, connected in sequence with a gas heated curing means and a liquid cooling means comprising a substantially horizontal conduit having a section supplied with a heated gas under pressure and a section supplied with a cooling liquid under pressure for the continuous heat curing and then cooling under a substantially consistent pressure of the insulating covering of the curable polymeric material about the electrical conductor moving from the extruder through the conduit, said substantially horizontal conduit having a closed chamber interposed therein between and in direct fluid communication with the section supplied with a heated gas under pressure and the section supplied with a cooling liquid under pressure, said closed chamber extending downward from the level of the substantially horizontal conduit for a substantial distance to provide a gravity feeding liquid reservoir chamber depending therefrom; a drain outlet connected with a lower portion of the closed chamber and a drain valve located in said drain outlet for controlling the discharge of liquid from the closed chamber; and, a pressure sensing regulator operating the drain valve and having pressure monitoring means responding to the pressure of the gas in the gas section of the conduit and the combined pressure of the gas with the pressure attributable to the weight of the liquid head contained within the closed chamber whereby the accumulation of liquid within the interposed closed chamber overcomes a predetermined balance of pressure between the source of gas and source of liquid and activates the drain valve to discharge liquid from the closed chamber.

7. The apparatus of claim 6, wherein an adjoining portion of the liquid section of the conduit connected with the closed chamber is of an enlarged cross sectional area of at least about twice the area of the remainder of the liquid section of the conduit.

8. The apparatus of claim 6, wherein a tubular leg depends from a portion of the liquid section of the conduit adjoining the closed chamber and connects with the closed chamber at an intermediate portion thereof below the substantially horizontal conduit and provides a fluid communicating bypass connection between the liquid section of the conduit and the closed chamber.

9. An apparatus for the continuous manufacture of insulated electrical conductors covered with heat cured polymeric compositions, comprising a combination of an extruder for the continuous formation of a covering of heat curable polymeric material about an elongated electrical conductor moving therethrough, connected in sequence with a gas heated curing means and a liquid cooling means comprising a substantially horizontal conduit having a section supplied with a heated gas under pressure and a section supplied with a cooling liquid under pressure for the continuous heat curing and then cooling under substantially constant pressure of the insulating covering of the curable polymeric material about the electrical conductor moving from the extruder through the conduit, said substantially horizontal conduit having a closed chamber interposed therein between and in direct fluid communication with the section supplied with a heated gas under pressure and the section supplied with a cooling liquid under pressure, said closed chamber extending downward from the level of the substantially horizontal conduit for a substantial distance to provide a gravity feeding liquid reservoir chamber depending therefrom; a portion of the section of the conduit supplied with a cooling liquid under pressure which connects with the closed chamber having an enlarged cross sectional area of at least about twice the area of the remainder of the section supplied with a cooling liquid; a tubular leg depending from a portion of the section of the conduit supplied with a cooling liquid under pressure which is adjacent to the closed chamber and connecting with the closed chamber at an intermediate portion thereof below the substantially horizontal conduit thereby providing a fluid communicating bypass connection between the section of the conduit with a cooling liquid under pressure and the closed chamber; a drain outlet connected with a lower portion of the closed chamber and a drain valve located in said drain outlet for controlling the discharge of liquid from the closed chamber; and, a pressure sensing regulator operating the drain valve and having pressure monitoring means responding to the pressure of the heating gas in the heating section of the conduit and the combined pressure of the gas with the pressure attributable to the weight of the cooling liquid head contained within the closed chamber whereby the accumulation of cooling liquid within the interposed chamber overcomes a predetermined balance of pressure between the source of heating gas and the source of cooling liquid and activates the drain valve to discharge cooling liquid from the closed chamber.

* * * * *